United States Patent
Nouda et al.

(10) Patent No.: US 9,664,986 B2
(45) Date of Patent: May 30, 2017

(54) PROJECTION-TYPE IMAGE DISPLAY DEVICE WITH SINGLE FAN

(71) Applicant: Panasonic Intellectual Property Management Co., Ltd., Osaka (JP)

(72) Inventors: Shinya Nouda, Osaka (JP); Atsushi Takagi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/857,143

(22) Filed: Sep. 17, 2015

(65) Prior Publication Data

US 2016/0004146 A1    Jan. 7, 2016

Related U.S. Application Data

(63) Continuation of application No. PCT/JP2014/002209, filed on Apr. 18, 2014.

(30) Foreign Application Priority Data

Apr. 18, 2013 (JP) ................................ 2013-087161
Jul. 4, 2013 (JP) ................................ 2013-140453

(Continued)

(51) Int. Cl.
*G03B 21/16* (2006.01)
*H04N 9/31* (2006.01)
(Continued)

(52) U.S. Cl.
CPC ........... *G03B 21/16* (2013.01); *G03B 21/145* (2013.01); *H04N 9/3144* (2013.01); *G03B 21/005* (2013.01)

(58) Field of Classification Search
CPC .............................. G03B 21/16; H04N 9/3144
See application file for complete search history.

(56) References Cited

U.S. PATENT DOCUMENTS 7,500,757 B2 * 3/2009 Hashimoto ............ G03B 21/16
    348/748
8,007,114 B2 * 8/2011 Chen ...................... G03B 21/16
    353/61
(Continued)

FOREIGN PATENT DOCUMENTS

CN      101644878 A    2/2010
CN      103838067 A    6/2014
(Continued)

OTHER PUBLICATIONS

International Preliminary Report on Patentability for corresponding International Application No. PCT/JP2014/002209 mailed Oct. 20, 2015.
(Continued)

*Primary Examiner* — Bao-Luan Le
(74) *Attorney, Agent, or Firm* — Renner, Otto, Boisselle & Sklar, LLP

(57) ABSTRACT

A projection-type image display device includes a light source unit, an image generating unit configured to generate image light according to an image input signal, an illuminating unit configured to guide the light from the light source unit to the image generating unit, a projecting unit configured to project the image light generated by the image generating unit, a housing that houses the light source unit, the image generating unit, the illuminating unit, and the projecting unit, a first radiator plate thermally connected to the light source unit, a second radiator plate thermally connected to the image generating unit, and a single fan disposed at an end of the housing, for taking in external air to the interior of the housing to send the air to the first and the second radiator plates.

1 Claim, 13 Drawing Sheets

(30) Foreign Application Priority Data

| Nov. 5, 2013 | (JP) | 2013-229153 |
| Nov. 5, 2013 | (JP) | 2013-229154 |
| Nov. 5, 2013 | (JP) | 2013-229156 |

(51) Int. Cl.
*G03B 21/14* (2006.01)
*G03B 21/00* (2006.01)

(56) References Cited

U.S. PATENT DOCUMENTS

| 8,246,171 | B2* | 8/2012 | Chen | G03B 21/16 165/151 |
| 9,039,255 | B2* | 5/2015 | Kase | G03B 21/145 362/368 |
| 9,152,025 | B2* | 10/2015 | Chen | G03B 21/16 |
| 9,207,523 | B2* | 12/2015 | Sun | G03B 21/16 |
| 2005/0117346 | A1 | 6/2005 | Morinaga | |
| 2006/0197916 | A1* | 9/2006 | Hashimoto | G03B 21/16 353/52 |
| 2007/0070303 | A1 | 3/2007 | Yonekubo | |
| 2010/0033690 | A1* | 2/2010 | Chen | G03B 21/16 353/61 |
| 2011/0019161 | A1* | 1/2011 | Chen | G03B 21/16 353/61 |
| 2012/0057137 | A1* | 3/2012 | Enomoto | H04N 9/3141 353/61 |
| 2012/0133907 | A1* | 5/2012 | Otani | G03B 21/16 353/58 |
| 2012/0293777 | A1* | 11/2012 | Kase | G03B 21/145 353/85 |
| 2013/0278905 | A1* | 10/2013 | Sung | G03B 21/16 353/57 |
| 2014/0198304 | A1* | 7/2014 | Sun | G03B 21/16 353/61 |
| 2014/0204345 | A1* | 7/2014 | Chen | G03B 21/16 353/31 |

FOREIGN PATENT DOCUMENTS

| JP | 10-333129 A | 12/1998 |
| JP | 11-119665 A | 4/1999 |
| JP | 2003-195420 A | 7/2003 |
| JP | 2004-184613 A | 7/2004 |
| JP | 2005-157083 A | 6/2005 |
| JP | 2005-321525 A | 11/2005 |
| JP | 2006-285059 A | 10/2006 |
| JP | 2007-072392 A | 3/2007 |
| JP | 2007-094154 A | 4/2007 |
| JP | 2007-248739 A | 9/2007 |
| JP | 2008-185757 A | 8/2008 |
| JP | 2010-054766 A | 3/2010 |
| JP | 2010-286699 A | 12/2010 |
| JP | 2012-145689 A | 8/2012 |
| JP | 2013-011651 A | 1/2013 |

OTHER PUBLICATIONS

International Search Report for corresponding International Application No. PCT/JP2014/002209 mailed Jul. 8, 2014.

Chinese Search Report dated Jun. 28, 2016 for corresponding Chinese Application No. 201480016286.0 and English translation.

* cited by examiner

PROJECTION-TYPE IMAGE DISPLAY DEVICE WITH SINGLE FAN

CROSS-REFERENCE TO RELATED APPLICATIONS

This is a continuation application of International Application No. PCT/JP2014/002209 with an international filing date of Apr. 18, 2014, which claims priority of Japanese Patent Application Nos.: 2013-087161 filed on Apr. 18, 2013; 2013-140453 filed on Jul. 4, 2013; 2013-229153 filed on Nov. 5, 2013; 2013-229154 filed on Nov. 5, 2013; and 2013-229156 filed on Nov. 5, 2013, the contents of which are incorporated herein by reference.

BACKGROUND

Technical Field

The present disclosure relates to a projection-type image display device having a cooling mechanism.

Today a projector is prevalent as a projection type image display device that magnifies and projects various images, and so on, on a screen. The projector modulates light emitted from a light source according to a video signal, by means of a spatial light modulator such as a digital micromirror device (DMD) or a liquid-crystal display element, to project the modulated light on the screen.

Various projectors have also been developed that are disposed on a ceiling to project images on a floor or a wall surface. The projectors disposed for use on the ceiling entail various problems to be studied, such as necessity for dedicated holders or wiring works, storage method, device size reduction, easiness in work, ease of use, and aesthetic sense.

In view of these problems, for example, Japanese Laid-Open Patent Publication No. 2008-185757 proposes a projection type image display device having a connector which is attachable to a wiring fixture for illumination and having an illumination device disposed on a housing surface facing the floor.

In a projector, an especially large quantity of heat is generated by a semiconductor laser element making up a light source and by a DMD or a liquid crystal display element serving as a spatial light modulator.

For this reason, the projector needs a cooling mechanism to suppress the rise of its internal temperature (e.g., Japanese Laid-Open Patent Publication Nos. 2013-011651 and h10-333129).

SUMMARY

The present disclosure provides a projection-type image display device having a cooling mechanism.

A projection-type image display device includes a light source unit, an image generating unit configured to generate image light according to an image input signal, an illuminating unit configured to guide the light from the light source unit to the image generating unit, a projecting unit configured to project the image light generated by the image generating unit, a housing that houses the light source unit, the image generating unit, the illuminating unit, and the projecting unit, a first radiator plate thermally connected to the light source unit, a second radiator plate thermally connected to the image generating unit, and a single fan disposed at an end of the housing, for taking in external air to the interior of the housing to send the air to the first and the second radiator plates.

According to the present disclosure, only one fan is used so that there can be provided a projection-type image display device having a simply configured cooling mechanism.

DETAILED DESCRIPTION OF EMBODIMENTS

Embodiments will hereinafter be described in detail with proper reference to the drawings. Note however that excessively detailed description may be omitted. For example, detailed description of already well-known matters and repeated description of substantially the same configuration may be omitted. This is for the purpose of preventing the following description from becoming unnecessarily redundant, to facilitate the understanding of those skilled in the art.

The inventors provide the accompanying drawings and the following description in order for those skilled in the art to fully understand the present disclosure and do not intend to limit the subject matters defined in the claims by them.

First Embodiment

1. Configuration of Projection-Type Image Display Device

Figure 1:
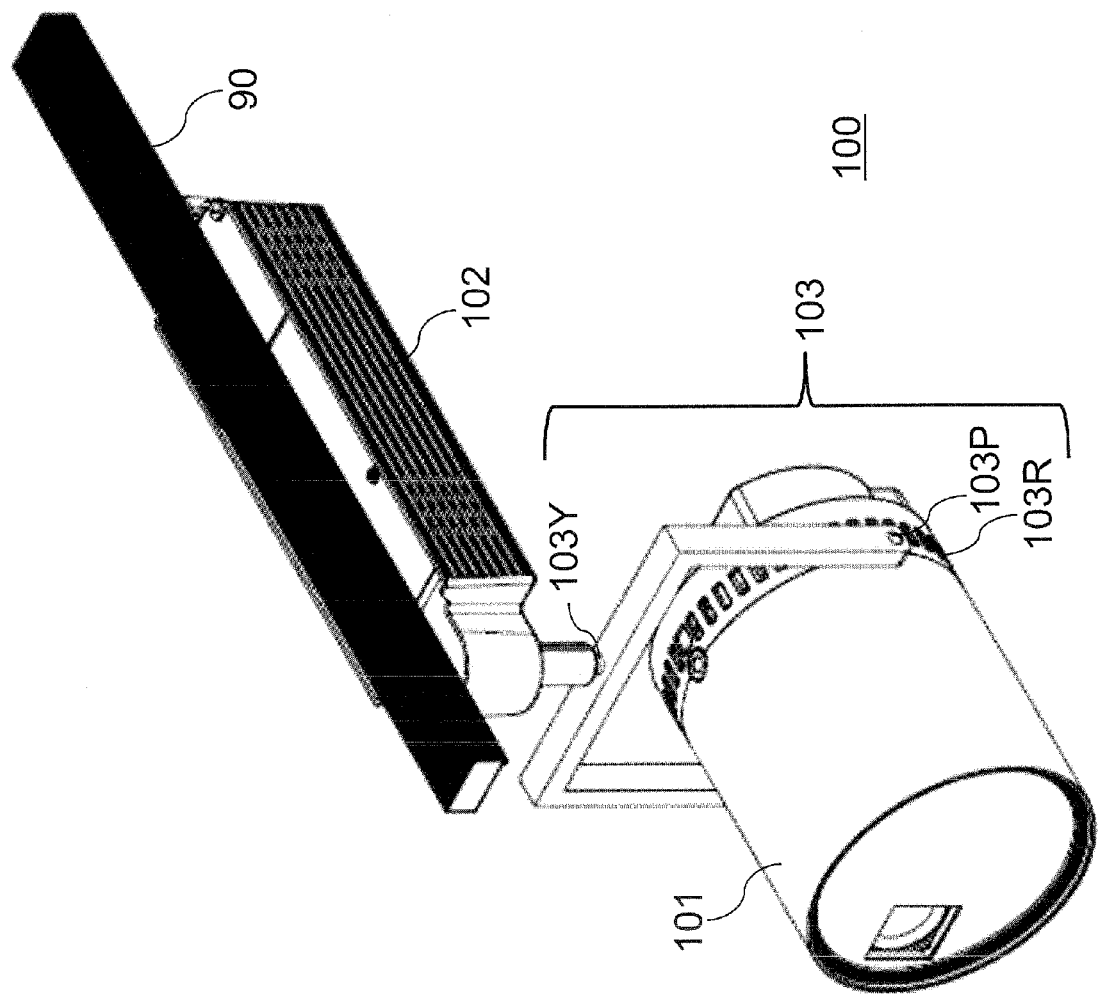
FIG. 1 is an external perspective view of a projection-type image display device according to a first embodiment of the present disclosure.

A projection-type image display device will now be described with reference to the drawings. FIG. 1 is a perspective view of the projection-type image display device, FIG. 2 is a front view of the projection-type image display device, and FIG. 3 is a block diagram showing a configuration of the projection-type image display device.

Figure 2:
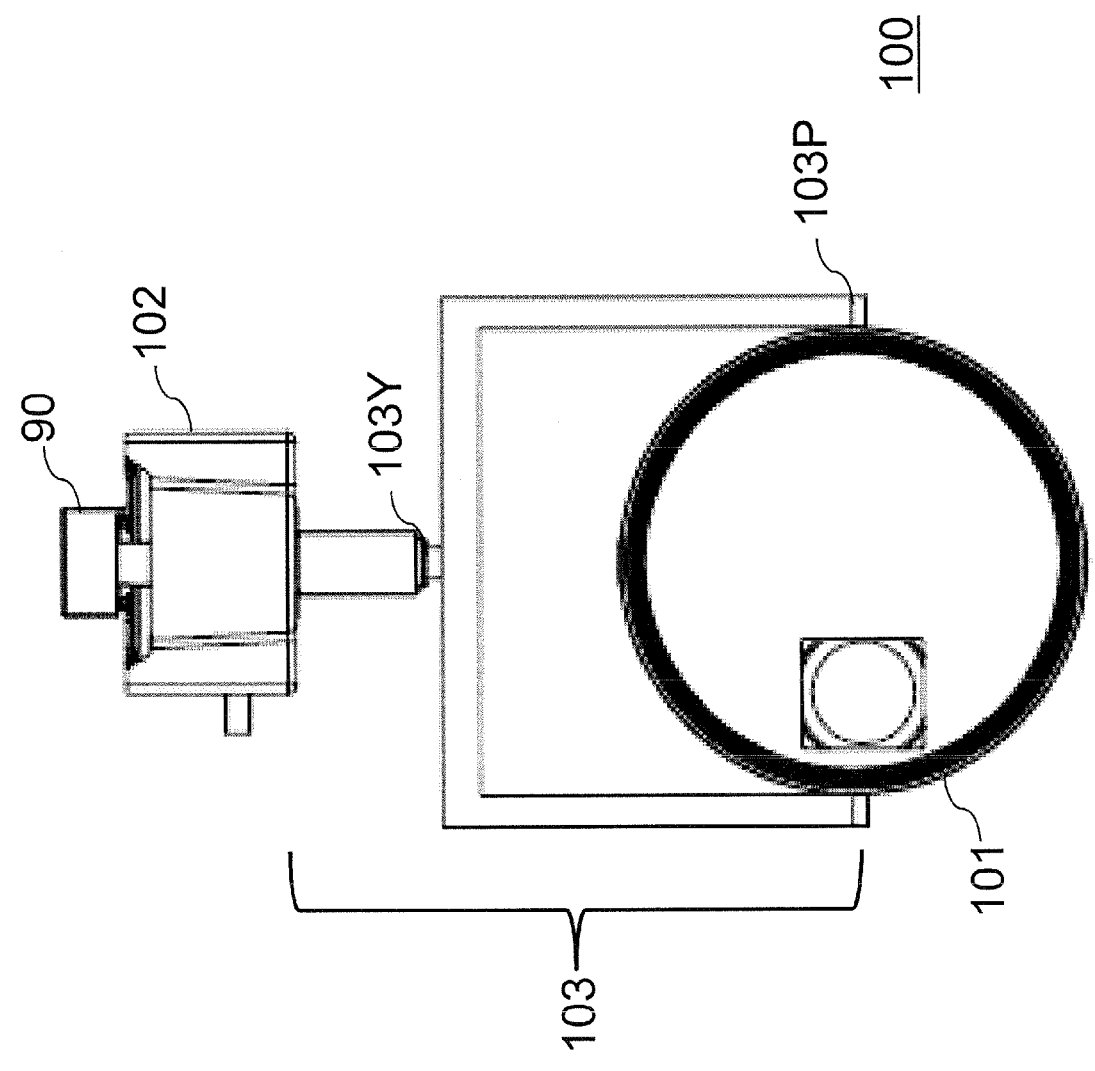
FIG. 2 is an external front view of the projection-type image display device according to the first embodiment.

As shown in FIGS. 1 and 2, the projection-type image display device 100 has a first housing 101 that mainly houses optical members therein and a second housing 102 that mainly stores a power supply unit (power supply board) therein. The second housing 102 is connectable to a wiring duct rail 90 for illumination. The second housing 102 receives a power supply voltage from the wiring duct rail 90 to convert the received voltage into a predetermined voltage and supply the converted voltage to the first housing 101.

The first housing 101 and the second housing 102 are connected together by a joint unit 103 which can rotate around mutually independent three axes. The joint unit 103 includes first to third joints 103Y, 103P and 103R. The first joint 103Y enables horizontal rotation (yawing) of the first housing 101 around the vertically extending axis. The second joint 103P enables rotation (pitching) of the first housing 101 in up-and-down direction of the first housing 101 around the horizontally extending axis. The third joint 103R enables rotation (rolling) of the first housing 101 along the peripheral direction of the first housing 101 around a center line (center axis) of the cylinder of the first housing 101 having a substantially cylindrical shape.

Figure 3:
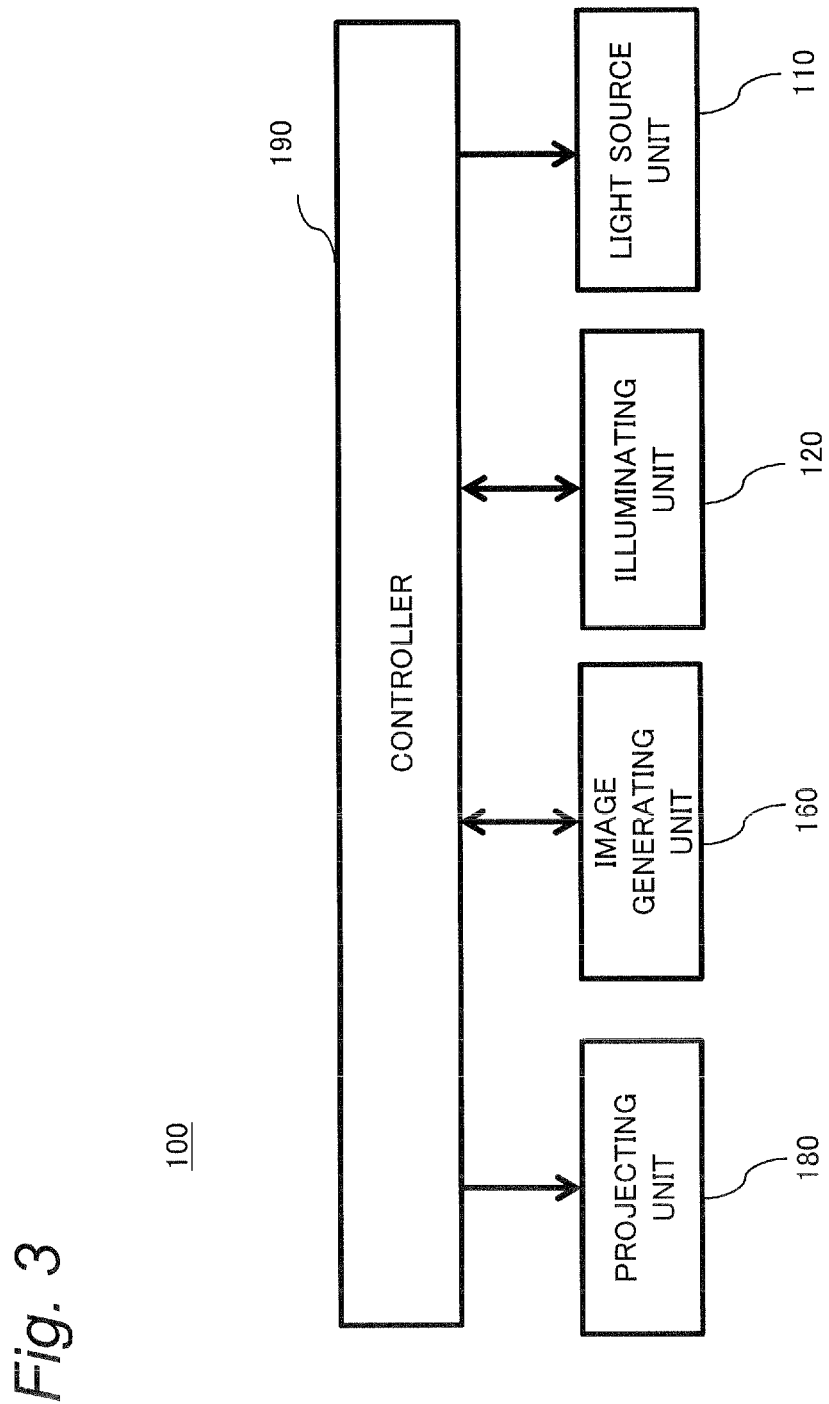
FIG. 3 is a block diagram showing a configuration of the projection-type image display device according to the first embodiment.

FIG. 3 is a view showing a configuration of the projection type image display device 100. As shown in FIG. 3, the projection type image display device 100 has a light source unit 110 that emits light, an image generating unit 160 that modulates the light from the light source unit 110 according to an input video signal to generate image light, an illuminating unit 120 that guides the light from the light source unit 110 to the image generating unit 160, a projecting unit 180 that projects the image light generated by the image generating unit 160 onto a screen (not shown), and a controller 190 that controls the light source unit 110, the illuminating unit 120, the image generating unit 160, and so on.

The light source unit 110 of the present disclosure has a semiconductor laser element which emits light, as excitation light, to excite fluorescent substance to emit light. The illuminating unit 120 is configured from optical members such as various lenses, mirrors, or rods to guide the light emitted from the light source unit 110 to illuminate the image generating unit 160. The image generating unit 160 uses elements such as a digital micromirror device (hereinafter, referred to as "DMD") and a liquid-crystal panel to spatially modulate the light according to a video signal. The projecting unit 180 is configured from optical members such as lenses and mirrors to magnify and project the spatially modulated light.

The internal configuration of the first housing 101 of the projection type image display device according to the present disclosure will be described with reference to FIGS. 4-7.

2. Internal Configuration of First Housing

Figure 4:
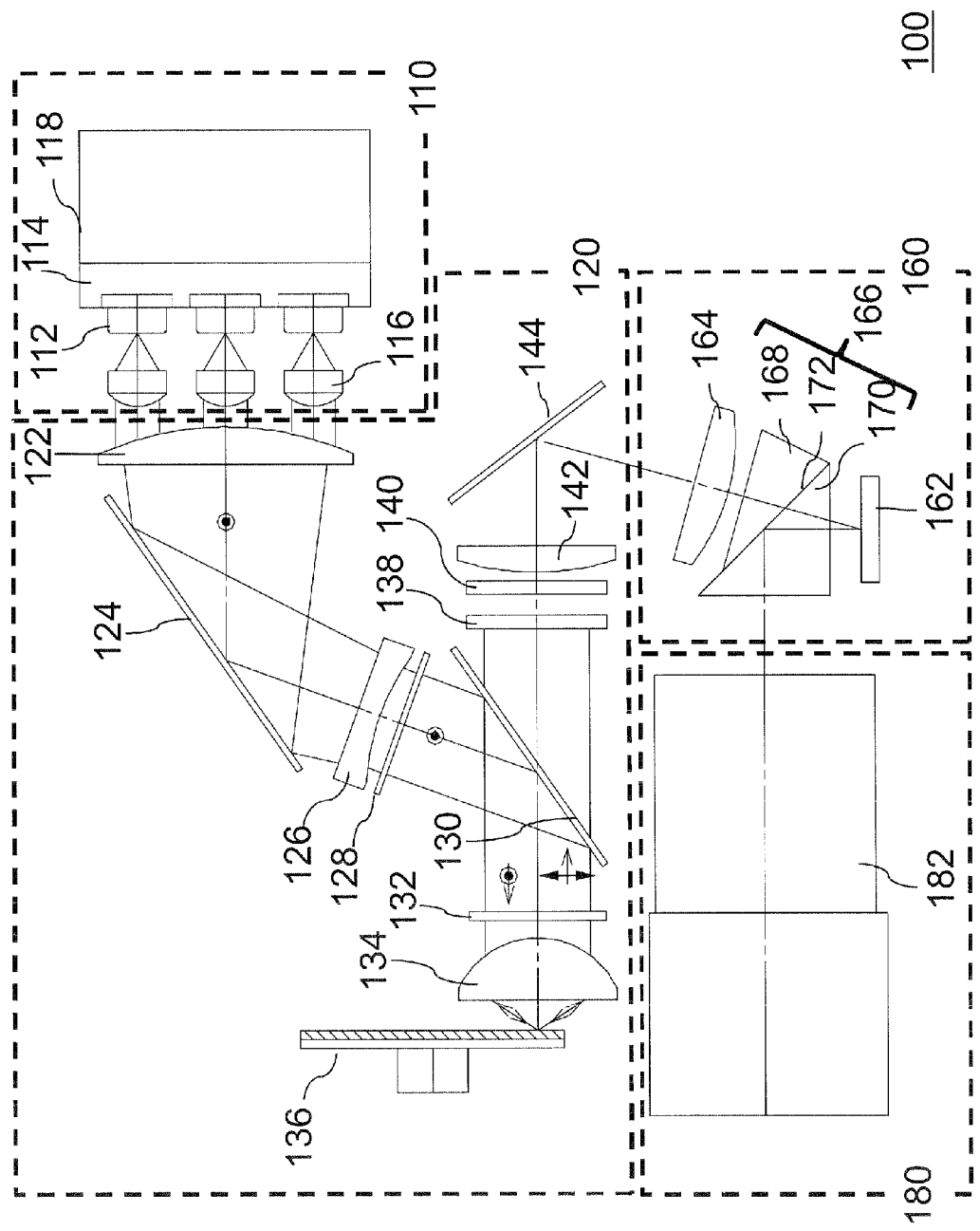
FIG. 4 is a view explaining an optical configuration of the projection-type image display device of the first embodiment.

FIG. 4 is a view explaining the optical configuration of the projection type image display device 100.

As shown in FIG. 4, the projection type image display device 100 is configured from the light source unit 110, the image generating unit 160 that generates image light according to an input video signal, the illuminating unit 120 that guides the light from the light source unit 110 to the image generating unit 160, and the projecting unit 180 that projects the image light generated by the image generating unit 160 onto a screen (not shown).

The light source unit 110 includes twelve semiconductor laser elements 112 arranged on a radiator plate 114 at certain intervals and two dimensionally in three rows and four columns, and lenses 116 each facing each semiconductor laser element 112. The lenses 116 condense the light emitted from the corresponding semiconductor laser elements 112 into parallel light.

A heat sink 118 is disposed at the back of the laser elements 112 on the radiator plate 114. The heat sink 118 is a device for cooling the semiconductor laser elements 112. The semiconductor laser elements 112 emit linearly polarized blue color light with a wavelength width of 440 nm to 455 nm. The semiconductor laser elements 112 are arranged such that the polarization direction of light emitted from each laser element 112 is s-polarization with respect to the plane of incidence of a dichroic mirror 130.

The light emitted from the light source unit 110 enters a convex lens 122 and is condensed (reduced in diameter) by the convex lens 122 to be incident on a mirror 124. The mirror 124 changes the optical path to make the light from the convex lens 122 enter a plano-concave lens 126. The mirror 124 is oriented with a predetermined angle (i.e., 55°) with respect to a principal ray of light outgoing from the lens 122. This causes the light to enter the dichromic mirror 130 at the predetermined angle (55°). The light of which optical path is changed enters a plano-concave lens 126 and is again converted to parallel light. The light converted to parallel light enters the dichromic mirror 130 through a diffuser 128. The diffuser 128 has a function of reducing the coherence while keeping the polarization property.

The dichroic mirror 130 is oriented on the optical path to cause the light to enter and leave the dichroic surface at the predetermined incident angle (55°). The light reflected by the dichroic mirror 130 enters a λ/4 plate 132 to be converted into circularly polarized light. The circularly polarized light is condensed by the lens 134 to be irradiated on a fluorescent wheel 136 with a spot diameter of 1 to 2 mm. The fluorescent wheel 136 includes an aluminum flat plate and is divided into a region B as an area of a diffuse reflecting surface, a region G that is coated with a fluorescent substance emitting green color light, and a region R that is coated with fluorescent substance emitting red color light.

The light irradiated on the fluorescent wheel 136 is reflected intactly on the region B, whereas blue color light is converted into green color light and red color light in the region G and the region R, respectively, with the converted color light being emitted toward the lens 134. The color light is again converted into parallel light by the lens 134 to enter the λ/4 plate 132. By again passing through the λ/4 plate 132, the blue color light is converted into p-polarized light to enter the dichroic mirror 130. The green and red color light converted by the fluorescent substance also enter the dichroic mirror 130. The dichroic mirror 130 has characteristics, for light with 440 nm to 445 nm in wavelength, of transmitting about 94% or more p-polarized light and reflecting s-polarized light at a high reflectance of 98% or more. Due to such characteristics, the blue color light incident on the dichroic mirror 130 via the diffuser 128 is reflected by the dichroic mirror 130, whereas the blue color light incident from the λ/4 plate 132 passes through the dichroic mirror 130. Thus, all the color lights incident from the λ/4 plate 132 pass through the dichroic mirror 130. As a result, the blue, green, and red color lights are emitted in a time-shared way.

The blue, green, or red color lights passing through the dichroic mirror 130 enters a pair of fly-eye lenses 138 and 140 composed of a plurality of lens elements. Light flux incident on the first fly-eye lens 138 is split into multiple light fluxes. The multiple light fluxes are converged on the second fly-eye lens 140. The lens elements of the first fly-eye lens 138 have an opening shape similar to the DMD 162 of the image generating unit 160. The lens elements of the second fly-eye lens 140 have a focal length defined to satisfy a condition that the first fly-eye lens 138 and the DMD 162 have a substantially conjugate relationship. The light outgoing the second fly-eye lens 44 enters a lens 142. The lens 142 is a lens for superimposing the light outgoing from the lens elements of second fly-eye lens 140 on the DMD 162. The light leaving the lens 142 is reflected by a mirror 144 and thereafter passes through a lens 164 to enter a total reflection prism 166.

The total reflection prism 166 is composed of two prisms 168 and 170 with a thin air layer 172 formed between adjoining surfaces of the two prisms. The air layer 172 totally reflects light incident at an angle not less than a critical angle. The light incident on the total reflection prism 166 via the lens 164 passes through a total reflection surface to enter the DMD 162. The DMD 162 deflects the micromirrors to cause the light to enter a projection lens 182 or advance toward the outside of the effective range of the projection lens 182, according to a video signal. The light reflected by the DMD 162 enters the air layer 172 at an angle not less than the critical angle and hence reflects to be incident on the projection lens 182. Thus, the image light formed by the END 162 is projected on a screen (not shown).

3. Cooling Configuration

Figure 5:
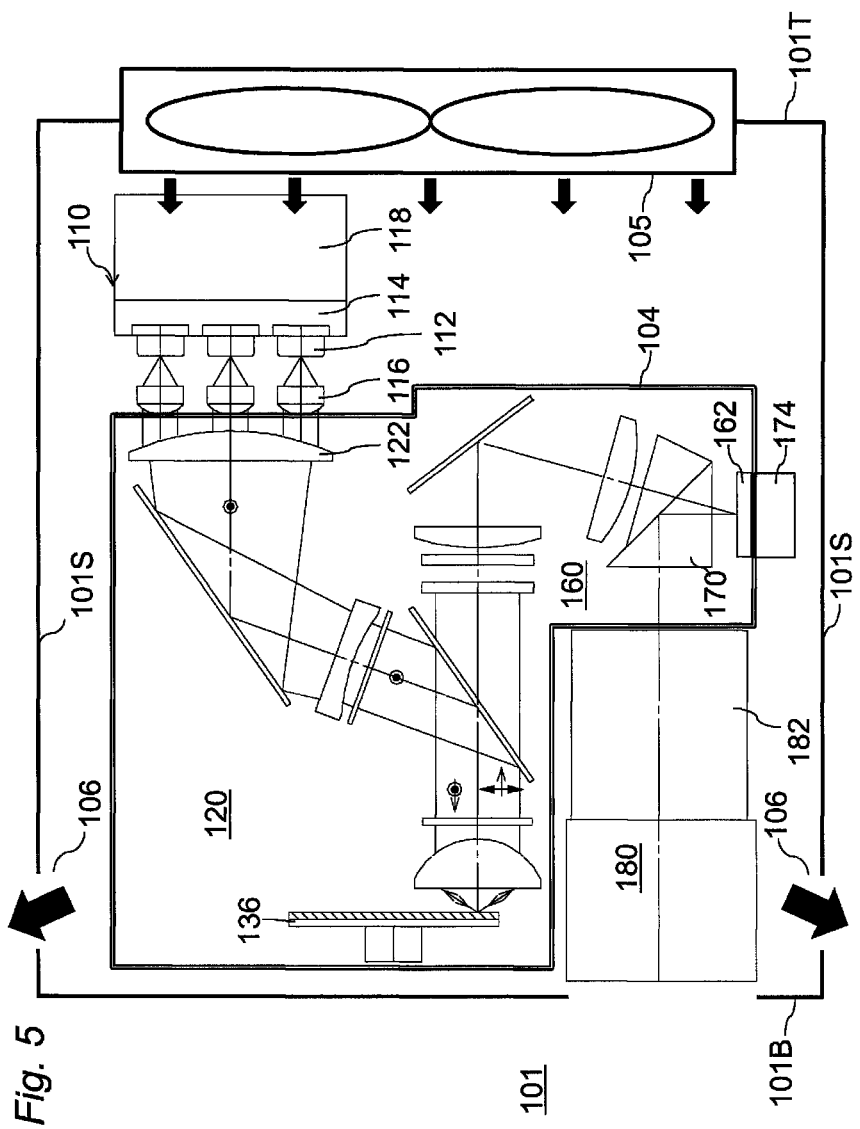
FIG. 5 is a schematic view explaining a cooling configuration of the projection-type image display device.

FIG. 5 is a view for explaining an internal cooling configuration of the first housing 101 of the projection-type image display device 100. In the first housing 101, the illuminating unit 120 and the image generating unit 160 are arranged on a common chassis 104. The projecting unit 180 is placed on the outside of the chassis 104. The projecting unit 180 is disposed on the side of a front surface 101B of the first housing 101 so that projection light from the projecting unit 180 is emitted from the front surface 101B side.

For dust proofing, the chassis 104 encloses the members of the illuminating unit 120 and the image generating unit 160 in a substantially hermetically sealed state. The chassis 104 has an enclosing portion and a lid portion, and is hermetically sealed with a packing (not shown) being inserted between the enclosing portion and the lid portion of the chassis 104.

A substantially hermetic sealing is established between the lens 116 and the lens 122 that correspond to a light incident portion of the illuminating unit 120, by arranging the chassis 104 and a member holding the lens 116 closely. An image light emitting portion of the image generating unit 160 is substantially hermetically sealed by arranging the chassis 104 and the projection lens 182 closely. According to such a configuration, in the first housing 101, air flow is substantially intercepted between the interior of the chassis 104 and the exterior space of the chassis 104.

A fluorescent wheel 136 is disposed in the interior of the chassis 104 so that air inside the chassis 104 is stirred by turning of the fluorescent wheel 136. Air flow generated as a result of this stirring cools heat generating bodies in the chassis 104, lowers the peak temperature inside the chassis, and uniforms the temperature, thus improving the heat radiation efficiency of the chassis 104. To facilitate the radiation of heat inside the chassis, at least a part of the chassis 104 is preferably made of metal such as aluminum.

The DMD 162 is disposed on the wall surface of the chassis 104, and a heat sink 174 is disposed on the external surface of the chassis 104 facing the DMD 162. On a rear surface 101T of the first housing 101 there is disposed a fan 105 that takes in air from the exterior to generate air flow inside the chassis 104 (small arrows of FIG. 5 indicate the direction of air flow generated by the fan 105).

Figure 6:
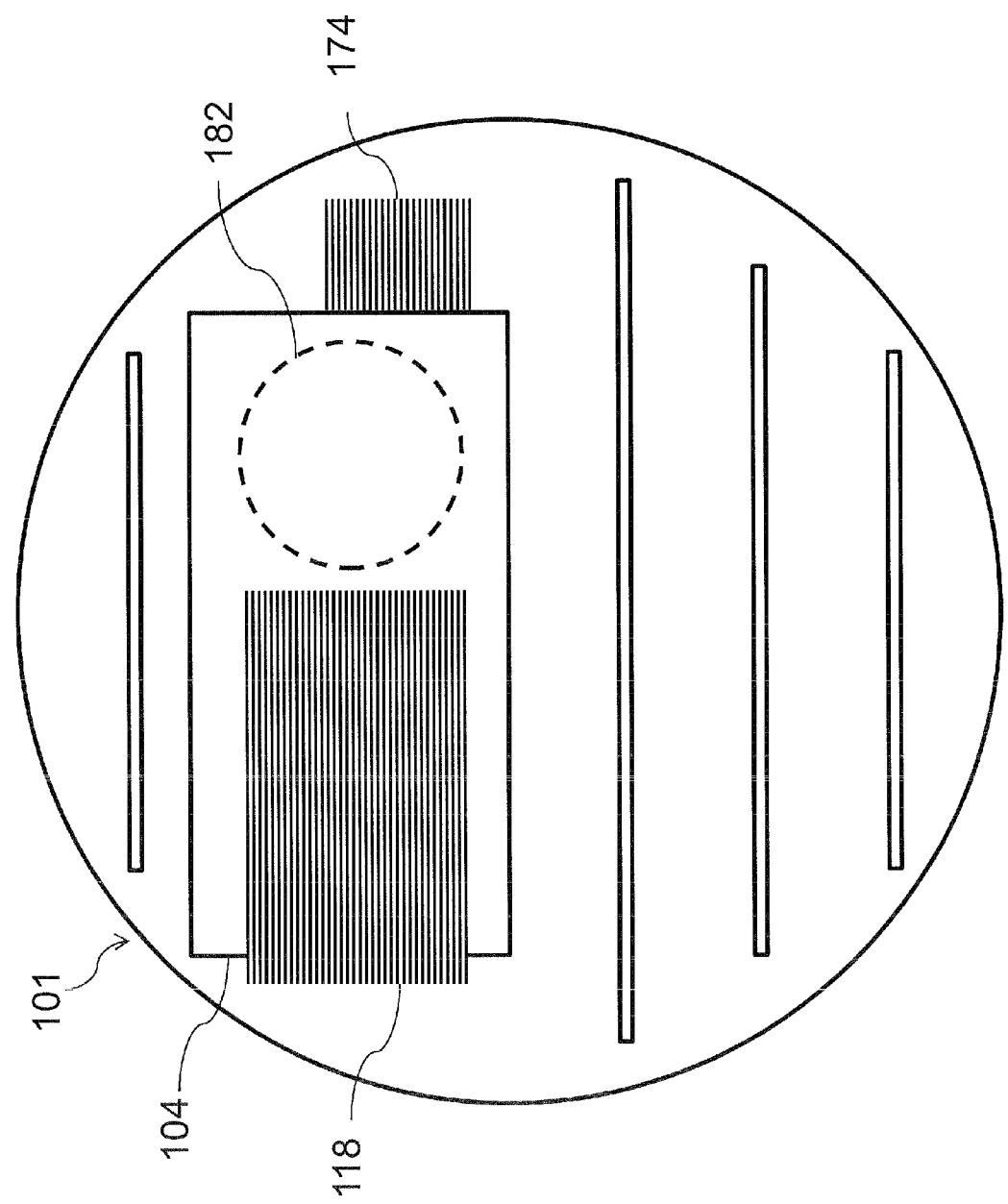
FIG. 6 is a view for explaining the cooling configuration of the projection-type image display device.

FIG. 6 is a view explaining the arrangement of components in the interior of the first housing 101 is when viewed from the fan 105 side. Air taken in from the exterior by the fan 105 cools a heat sink 118 and a heat sink 174, to consequently cool the semiconductor laser element 112 and the DMD 162. Flow of air along the outer wall of the chassis 104 cools the illuminating unit 120 and the image generating unit 160.

Figure 7:
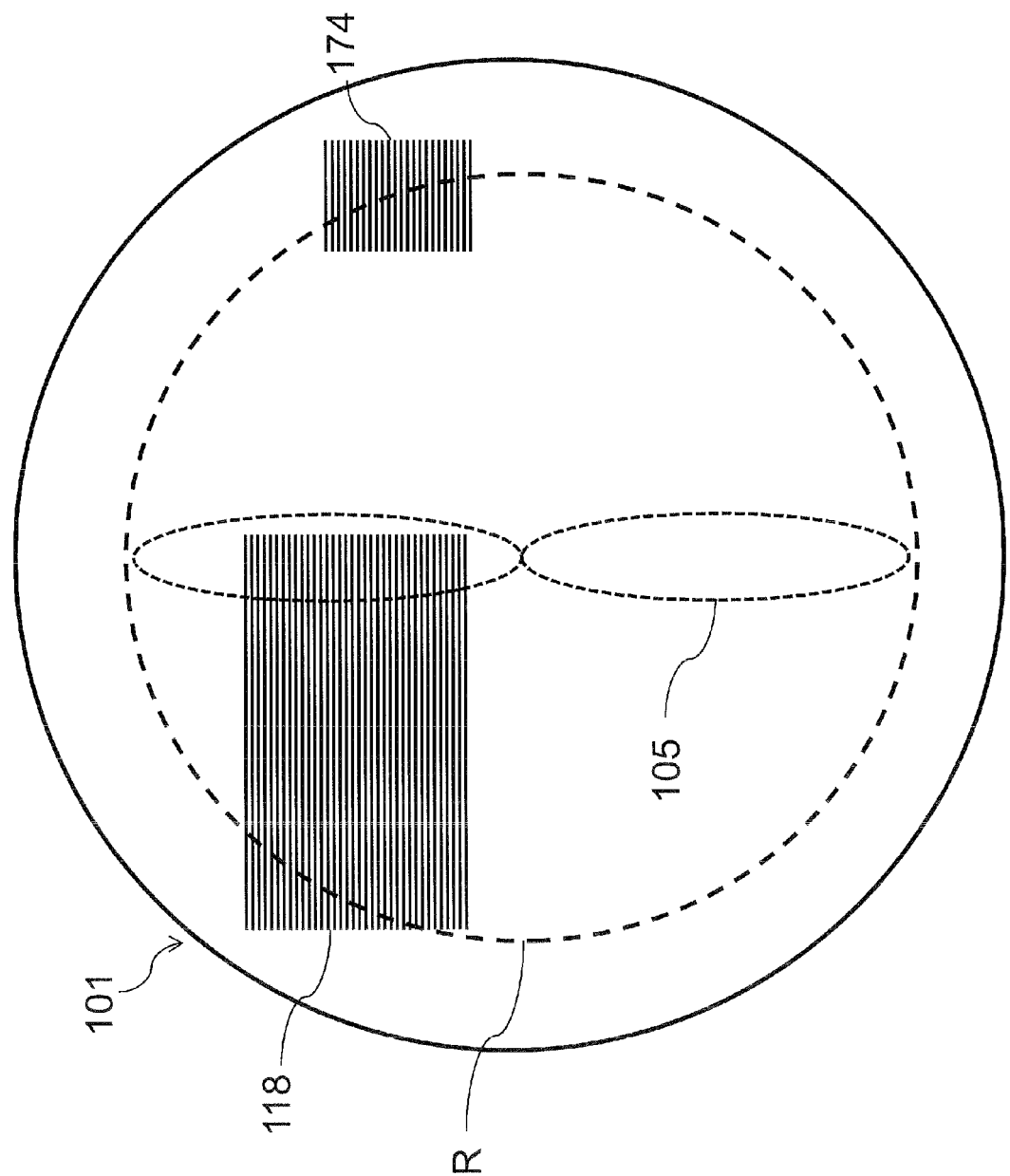
FIG. 7 is a view for explaining a blowing area of a fan of the projection-type image display device.

FIG. 7 is a drawing explaining a positional relationship between an area of blowing by the fan 105 and the heat sinks 118 174. In the drawing, a broken line R (circumference whose diameter is the length of the fan 105) conceptually indicates an area (blowing area) where air flow is generated by the fan 105. The fan 105 is disposed to achieve a blowing area that overlaps with at least the respective parts of the heat sink 118 and the heat sink 174 (in other words, air flow generated by the fan 105 directly impinges on at least the respective parts of the heat sink 118 and the heat sink 174). That is, in order to cool a plurality of heat sources, the fan 105 is placed at the rear of the first housing 101 so that its blowing area covers at least the respective parts of the plurality of heat sources.

Figure 8:
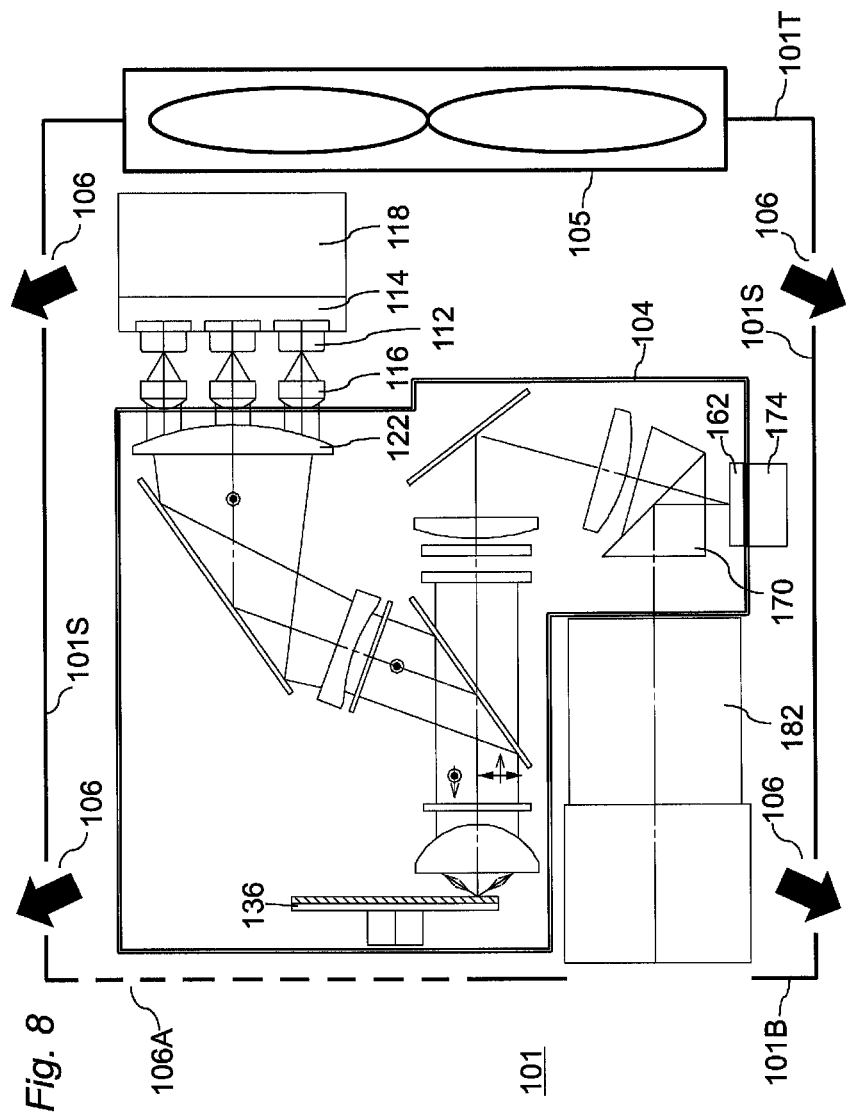
FIG. 8 is a view for explaining another cooling configuration of the projection-type image display device.

In the first housing 101 there are vertically arranged, in addition to the optical system, e.g., a ballast power supply for driving the semiconductor laser element 112, and a control board for generating image light while synchronizing the semiconductor laser element 112, the fluorescent wheel 136, and the DMD 162 with each other (see FIG. 6). The various boards are cooled by allowing air to flow through spaces among these boards. Air cooling the interior of the first housing 101 is discharged from vents 106 disposed at the front side of two lateral surfaces 101S of the first housing 101. The vents 106 may be disposed also at the rear side of the two lateral surfaces 101S of the first housing 101 as shown in FIG. 8. Alternatively, the vents 106 may be disposed only at the rear side with the vent 106 not disposed at the front side of the two lateral surfaces 101S of the first housing 101.

4. Effect, Etc.

The projection-type image display device 100 is provided with: the light source unit 110; the image generating unit 160 that generates image light according to an image input signal; the illuminating unit 120 that guides the light from the light source unit 110 to the image generating unit 160; the projecting unit 180 that projects the image light generated by the image generating unit 160; the housing 101 that houses the light source unit 110, the image generating unit 160, the illuminating unit 120 and the projecting unit 180; the heat sink 118 (an example of a first radiator plate) that is thermally connected to the light source unit 110; the heat sink 174 (an example of a second radiator plate) that is thermally connected to the image generating unit 160; and the single fan 105 disposed at an end of the housing 101 to take in external air into the interior of the housing 101 to send air to the heat sinks 118 and 174.

In this manner, the device is Configured to cool the heat sink 118 (i.e., the semiconductor laser element 112) and the heat sink 174 (i.e., the DMD 162) by the single fan 105. Thus, the cooling mechanism can be implemented by a simple configuration, achieving a size-reduction of the device.

The projection-type image display device 100 is provided with the hermetically sealed chassis 104 (an example of the hermetically sealed housing) that is disposed inside the first housing 101 including the image generating unit 160 and the illuminating unit 120. The hermetical sealing of the chassis 104 allows dust-proofing property to be secured. The chassis 104 further includes a rotating body (the fluorescent wheel 136 and/or a trimming wheel as described later). Rotation of the rotating body (the fluorescent wheel) in the chassis stirs air inside the chassis and air flow occurring as a result of stirring cools the heat generating bodies in the chassis 104, lowering the peak temperature inside the chassis to achieve a uniform temperature. This enables chassis 104 to have improved heat radiation efficiency.

In the present embodiment, mainly the illuminating unit 120 and the image generating unit 160 are arranged and included inside the common chassis 104 in a substantially hermetically sealed state. This can prevent major optical members from being exposed to dusts, etc.

Second Embodiment

Another internal configuration of a first housing of the projection-type image display device according to the present disclosure will be described with reference to FIGS. 9 to 11. In the following, differences from the first embodiment will be described.

1. Optical Configuration

Figure 9:
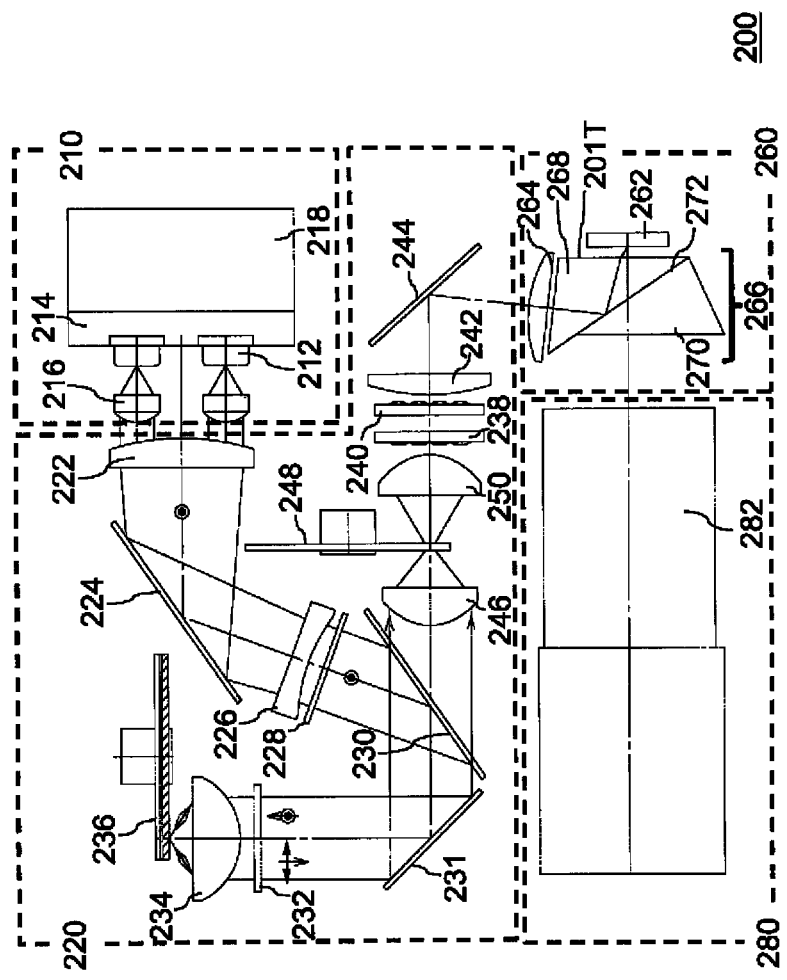
FIG. 9 is a view explaining an optical configuration of a projection-type image display device of a second embodiment according to the present disclosure.

FIG. 9 is a schematic view explaining an optical configuration of a projection-type image display device 200 of a second embodiment. FIGS. 10 and 11 are schematic views explaining a cooling configuration of the projection-type image display device 200. The projection-type image display device 200 of the present embodiment is further provided with, in the first housing, a trimming wheel 248 for generating color light with a higher purity with respect to red, blue, and green light colors.

As shown in FIG. 9, the projection-type image display device 200 has a light source 210, an image generating unit 260 that generates image light according to an image input signal, an illuminating unit 220 that guides the light from the light source unit 210 to the image generating unit 260, and a projecting unit 280 that projects the image light generated by the image generating unit 260 onto a screen (not shown).

The light source unit 210 includes eight semiconductor laser elements 212 arranged on a radiator plate 214 at a certain interval two-dimensionally in two rows and four columns, with lenses 216 being arranged facing the semiconductor laser elements 212, respectively. The lenses 216 condense light emitted from the corresponding semiconductor laser elements 212 into parallel light.

A heat sink 218 is disposed on the rear surface of the radiator plate 214. The heat sink 218 serves to cool the semiconductor laser elements 212. The semiconductor laser elements 212 emit linearly polarized blue color light with a wavelength width of 440 nm to 455 nm. The semiconductor laser elements 212 are arranged such that the polarization direction of light emitted therefrom is S-polarization with respect to the plane of incidence of a dichroic mirror 230.

The light emitted from the light source unit 210 enters a convex lens 222 to be condensed (reduced in diameter) to exit to a mirror 224. The mirror 224 changes the optical path such that the light from the convex lens 222 falls on a plano-concave lens 226. The mirror 224 is oriented with a predetermined angle (i.e., 55°) with respect to a principal ray of light exiting from the lens 222. The light whose optical path is changed enters the plano-concave lens 226 to be converted into parallel light. The light converted into parallel light is incident to the dichromic mirror 230 by way of a diffuser 228.

Similar to the first embodiment, the dichroic mirror 230 is oriented on the optical path such that the light enters and leaves the dichroic surface at a predetermined angle (55°) with respect to a normal of the dichroic surface. The light reflected by the dichroic mirror 230 is bent 90° in its optical path to enter a $\lambda/4$ plate 232 for conversion into circularly polarized light. The circularly polarized light is condensed by a lens 234 so as to be irradiated onto a fluorescent wheel 236 with a spot diameter of 1 to 2 mm. The light irradiated on the fluorescent wheel 236 is converted in respective regions into blue, green, and red color light, which each color light is emitted toward the lens 234. Each color light returns to the dichroic mirror 230 by way of the lens 234, the $\lambda/4$ plate 232, and a mirror 231. The dichroic mirror 230 allows blue, green, and red color lights to pass therethrough.

The blue, green, and red color lights passing through the dichroic mirror 230 are condensed by a lens 246 so as to be irradiated onto the trimming wheel 248 with spot diameter of 0.2 to 1 mm. A difference from the first embodiment lies in having the trimming wheel 248. The trimming wheel 248 is split into three different transmission regions and is driven in synchronism with rotation of the fluorescent wheel 236.

Specifically, at the timing when the blue color light enters, a diffusion region diffusing and transmitting the blue color light crosses the optical path. At the timing when the green color light enters, a filter region crosses the optical path, which reflects the light of the semiconductor laser elements 212 unconverted by the fluorescent substance but transmits only green light color with a predetermined wavelength bandwidth. At the timing when red color light enters, a filter region crosses the optical path, which reflects the light of the semiconductor laser elements 212 unconverted by the fluorescent substance but transmits only red light color with a predetermined wavelength bandwidth. Such a function of the trimming wheel 248 enables emission of color light having a higher purity than the case of the first embodiment.

The blue, green, red color light passing through the trimming wheel 248 is converted by a lens 250 into parallel light. The light converted into parallel light leaves the illuminating unit 220 via a pair of fly-eye lenses 238 and 240, a lens 242, and a mirror 244, to enter the image generating unit 260.

The light entering the image generating unit 260 passes through a lens 264 to enter a total reflection prism 266. The total reflection prism 266 is composed of two prisms 268 and 270, with a thin air layer 272 being formed between adjoining surfaces of the two prisms.

The light entering the total reflection prism 266 is reflected by a total reflection surface to enter a DMD 262. In this point, the present embodiment also differs from the first embodiment. Such a configuration as to reflect light by the total reflection surface enables the DMD 262 to be disposed facing a surface 201T of a first housing 201 opposite to a projection lens 282. The light reflected by the DMD 262 passes through the total reflection surface to enter the projection lens 282. Thus, the image light formed by the DMD 262 is projected onto the screen (not shown).

2. Cooling Configuration

Figure 10:
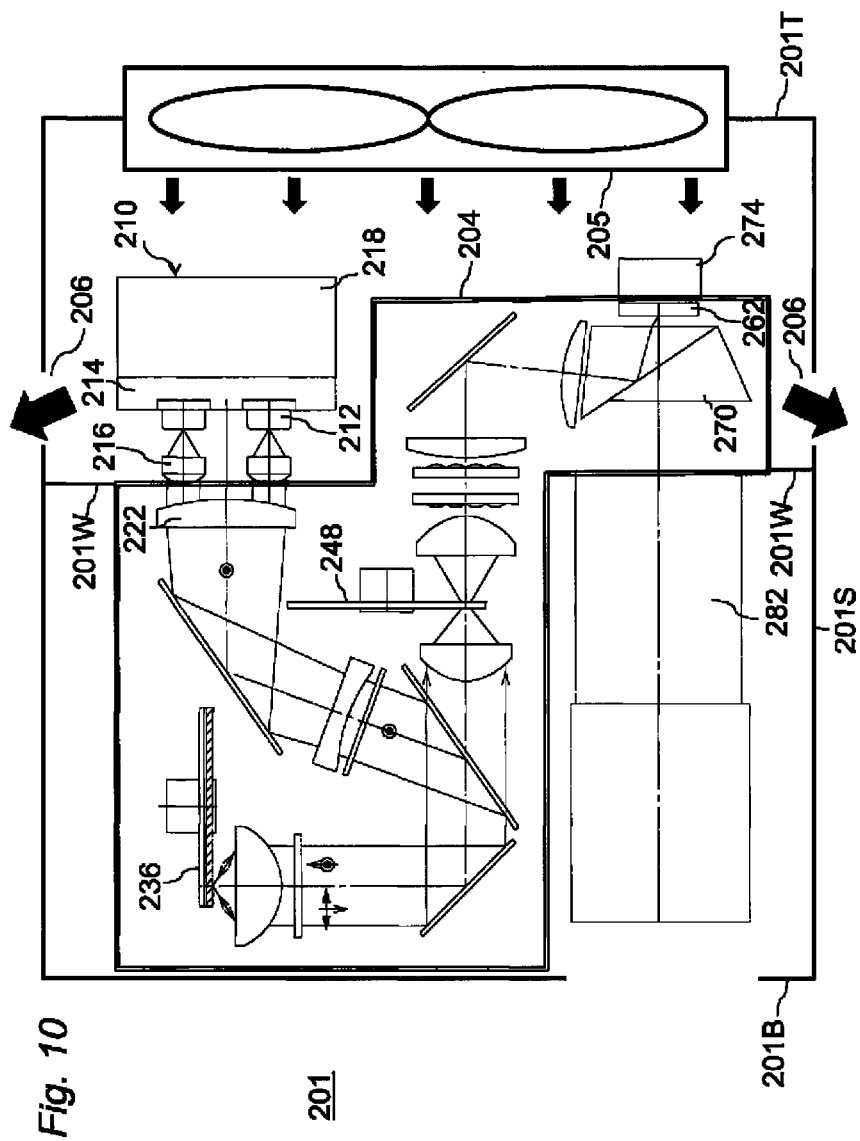
FIG. 10 is a view explaining a cooling configuration of the projection-type image display device according to the second embodiment.

FIG. 10 is a view for explaining an internal cooling configuration of the first housing 201 of the projection-type image display device 200. In the first housing 201, the illuminating unit 220 and the image generating unit 260 are arranged on a common chassis 204. For the purpose of dust proofing, similar to the first embodiment, the chassis 204 substantially hermetically sealed also houses members of the illuminating unit 220 and the image generating unit 260. To this end, a packing (not shown) is interposed between the enclosing portion and the lid portion of the chassis 204.

In addition to the fluorescent wheel 236, the trimming wheel 248 is placed inside the chassis 204. In the present embodiment, rotation of two wheels, i.e., the fluorescent wheel 236 and the trimming wheel 248 causes air in the interior of the chassis 204 to be stirred more strongly. This stirring makes uniform the temperature in the chassis, eliminating regions where the temperature becomes locally high. It is to be noted that, since the directions of the rotation axes of the two wheels 236 and 248 differ from each other (orthogonal), air inside the chassis 204 can be stirred more.

The DMD 262 is placed on the wall surface on the side of the rear surface 201T of the first housing. A heat sink 274 is disposed at a position on the exterior of chassis 204 corresponding to the DMD 262. A fan 205 is disposed on the rear surface 201T of the first housing 201.

Air taken in externally by the fan 205 cools the heat sinks 218 and 274, thereby cooling the semiconductor laser elements 212 and the DMD 262. The vents 206 are disposed in side walls 201S of the first housing 201. In the vicinity of the vents 206 inside the first housing 201, a partition plate 201W extends between the chassis 204 and the lateral surfaces of the first housing 201. By this partition plate 201W, air taken in by the fan 205 is ejected through the vents 206 disposed before the partition plate 201W. This configuration enables the semiconductor laser elements 212 and the DMD 262 to be sufficiently cooled.

On the other hand, in the region extending toward the projection lens 282 (toward a front surface 201B of the first housing 201) from the partition plate 201W, there are arranged, in addition to the chassis 204, ballast power supply (not shown), semiconductor laser elements 212, the fluorescent wheel 236, the trimming wheel 248, and the DMD 262, and a control board (not shown) for generating image light while synchronizing them. Air flow generated by rotation of the two wheels 236 and 248 cools these components and uniforms the temperature within the chassis 204.

3. Variations of Cooling Configuration

Figure 11:
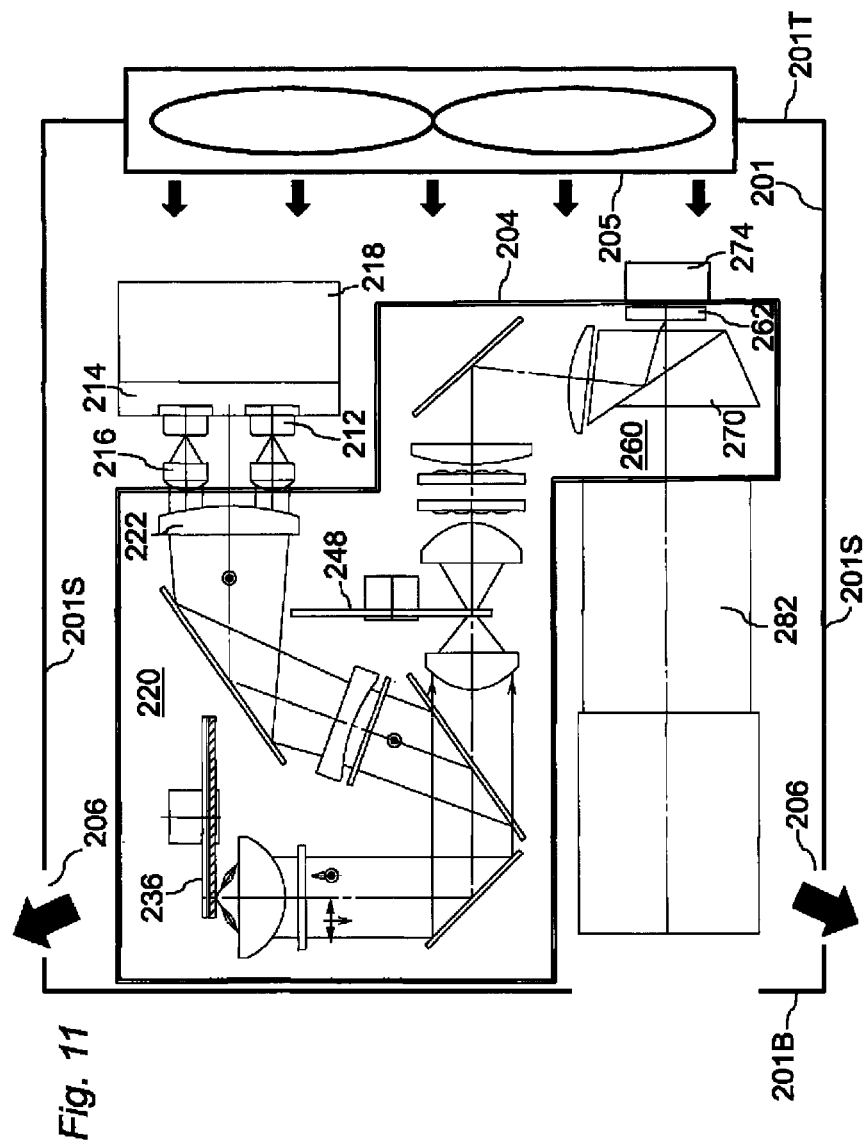
FIG. 11 is a view explaining another cooling configuration of the projection-type image display device according to the second embodiment.

FIG. 11 is a view for explaining another example of the internal cooling configuration of the first housing 201. The configuration shown in FIG. 11 differs from the configuration shown in FIG. 10 in that the vents 206 are disposed in the front part of the side walls 201S of the first housing 201 and the partition plate 201W is not disposed.

In the configuration shown in FIG. 11, air taken in externally by the fan 205 cools the heat sinks 218 and 274 to thereby cool the semiconductor laser elements 212 and the DMD 262. Furthermore, the externally taken-in air flows along the side walls of the chassis 204 to thereby cool the illuminating unit 220 and the image generating unit 260. Air cooling the interior of the first housing 201 is discharged from the vents 206 to the exterior.

4. Effect, Etc.

In the present embodiment, the semiconductor laser elements 212 are arranged in 2×4 array so as to reduce the width of light flux, in addition to obtain the effect of the first embodiment, thus enabling various optical components of the illuminating unit 220 to be compactly-arranged. Furthermore, addition of the trimming wheel 248 permits transmission of only color light having a predetermined wavelength bandwidth, thus improving the color purity of each color. Furthermore, the two wheels (the fluorescent wheel 236 and the trimming wheel 248) of which rotation axes are orthogonal to each other in the chassis 204 cause air within the chassis 204 to be more stirred to lower the temperature of heat sources in the chassis 204 and to uniform more the temperature within the chassis, thereby achieving an effective heat radiation from the wall surface making up the chassis 204.

In the present embodiment, use of the total reflection prism 266 in the image generating unit 260 enables the heat sink 274 cooling the DMD 262 and the heat sink 218 cooling the semiconductor laser elements 212 to be arranged side by side in the direction orthogonal to the blowing direction (the direction of small arrows in FIGS. 10 and 11) of the fan 205. As a result, dimension in radial direction of the cylindrical first housing 201 can be reduced.

Third Embodiment

Still another internal configuration of the first housing of the projection-type image display device according to the present disclosure will be described with reference to FIG. 12. The difference from the second embodiment will mainly be described below.

Figure 12:
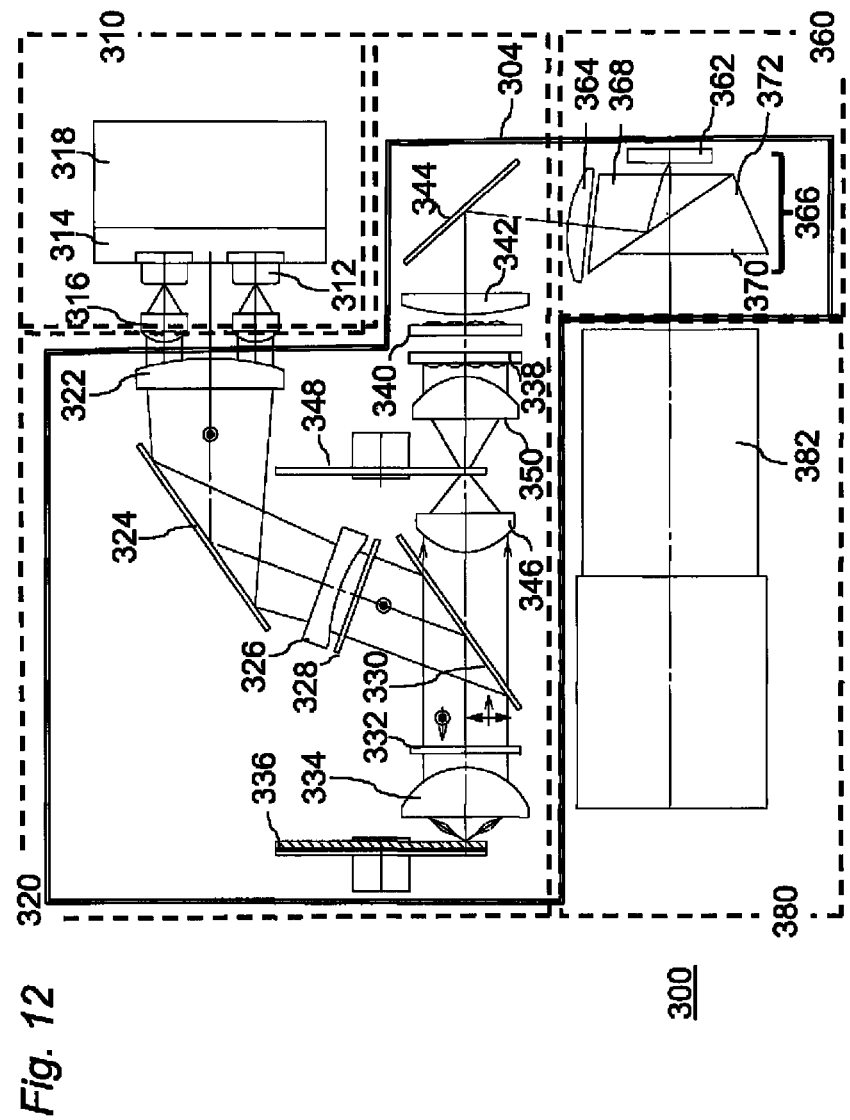
FIG. 12 is a view explaining an optical configuration of a projection-type image display device according to a third embodiment of the present disclosure.

FIG. 12 is a schematic view explaining an optical configuration of a projection-type image display device 300. In the present embodiment, the arrangement of a fluorescent wheel 336 differs from that of the second embodiment.

As shown in FIG. 12, the projection-type image display device 300 has a light source unit 310, an image generating unit 360 that generates image light according to an image input signal, an illuminating unit 320 that guides the light from the light source unit 310 to the image generating unit 360, and a projecting unit 380 that projects image light generated by the image generating unit 360 onto a screen (not shown).

The light source unit 310 includes eight semiconductor laser elements 312 arranged on a radiator plate 314 at a certain interval two-dimensionally in 2 rows and 4 columns, with lenses 316 being arranged facing the semiconductor laser elements 312, respectively. A heat sink 318 is disposed on the rear surface of the radiator plate 314.

The light emitted from the light source unit 310 enters a convex lens 322 to be condensed (reduced in diameter) to be incident to a mirror 324. The mirror 324 changes the optical path such that the light from the convex lens 322 falls on a plano-concave lens 326. The light whose optical path is changed enters the plano-concave lens 326 to be converted into parallel light. The light converted into parallel light is incident to a dichromic mirror 330 by way of a diffuser 328.

The light reflected by the dichroic mirror 330 enters a λ/4 plate 332 to be converted into circularly polarized light. The circularly polarized light is condensed by a lens 334. The light irradiated on the fluorescent wheel 336 is converted into blue, green, and red color lights in the respective regions, and each color light is emitted to the lens 334. Each color light returns to the dichroic mirror 330 by way of the lens 334 and the λ/4 plate 332.

The blue, green, or red color light passing through the dichroic mirror 330 is condensed by a lens 346 onto the trimming wheel 348. Similar to the second embodiment, the trimming wheel 348 is split into three different transmission regions and is driven in synchronism with rotation of the fluorescent wheel 336.

The blue, green, or red color light passing through the trimming wheel 348 is converted by a lens 350 into parallel light. The light converted to parallel light leaves the illuminating unit 320 to enter the image generating unit 360 via a pair of fly-eye lenses 338 and 340, a lens 342, and a mirror 344.

The light entering the image generating unit 360 passes through a lens 364 to enter a total reflection prism 366. The total reflection prism 366 is composed of two prisms 368 and 370, with a thin air layer 372 formed between adjoining surfaces of the two prisms. The light entering the total reflection prism 366 is reflected by a total reflection surface to enter a DMD 362. The light reflected by the DMD 362 enters a projection lens 382. Thus, the image light formed by the DMD 362 is projected onto a screen (not shown).

The illuminating unit 320 and the image generating unit 360 are stored in the chassis 304 hermetically sealed.

The cooling configuration (the fan, the vents, and so on.) described in the second embodiment is applicable as the cooling configuration of the present embodiment, achieving the same effect.

The present embodiment is so configured as to reduce the number of optical components (e.g., the mirror 231) in addition to obtain the effect of the second embodiment. This results in a reduced cost and in easiness of adjustment at the time of assembling. The control board, and so on are arranged in free spaces so that the entire device can be downsized.

Other Embodiments

As above, the first to third embodiments are described as exemplifications of the technique disclosed in the present application. However, the technique in the present disclosure is not limited thereto and is applicable to embodiments undergoing proper changes, permutations, additions, omissions, etc. A new embodiment may be provided by combining constituent elements described in the first to third embodiments.

Thus, other embodiments will be exemplified below.

(A) In the above embodiments, the configuration is described where the semiconductor laser element emitting blue color light is used as an example of the light source unit. However, the present disclosure is not limited thereto. A semiconductor laser element emitting UV laser light may be used or a semiconductor laser element or a LED emitting various color lights may be used.

(B) Although in the above embodiments, the arrangement is made such that light from each of plurality of semiconductor laser elements is incident on the dichroic mirror in s-polarization, it may be incident on p-polarization in view of the arrangement and dimensions of the entire optical configuration.

(C) Although in the above embodiments, the configuration is made such that an aluminum flat plate is used as the fluorescent wheel so as to provide a reflection-type configuration, a glass plate formed with a reflection film may be used or the fluorescent wheel may have a transmission-type configuration in view of the arrangement and dimensions of the entire optical configuration.

On the other hand, although the trimming wheel has the transmission-type configuration, it may have the reflection-type configuration in view of the arrangement and dimensions of the entire optical configuration.

(D) Although the above embodiments describe the configuration in which the pair of fly-eye lenses are used as an integrator that uniforms illuminance distribution, a straight rod or a tapered rod may be used as the integrator.

(E) Although the above embodiments describe the configuration in which the heat sink is used as cooling means that cools the light source unit and the image generating unit, a heat pipe may be used or cooling liquid may be circulated by use of a pump. Alternatively, cooling may be achieved by natural heat radiation without using the fan.

(F) In the above embodiments describe the configuration in which external air is taken in by the fan 105 or 205 into the interior of the projection-type image display device 100 or 200 and the intake external air is discharged via the vents 106 or 206 to the exterior. Flow of air currents by the fan 105 or 205 may be reversed. For example, the action of the fan 105 or 205 may be controlled such that internal air of the projection-type image display device 100 or 200 is discharged by the fan 105 or 205 to the exterior and that external air is taken in via the vent 106 or 206 into the interior of the projection-type image display device 100 or 200.

Figure 13:
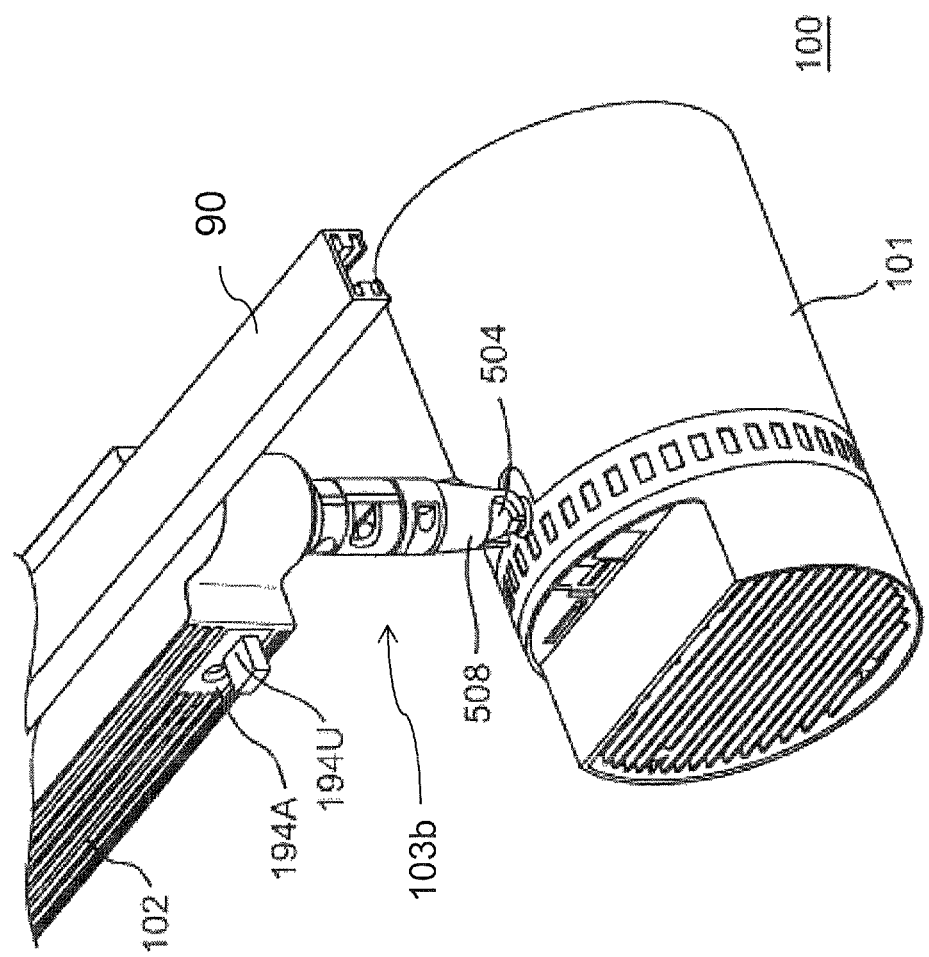
FIG. 13 is an external perspective view of another example of the projection-type image display device according to the present disclosure.

(G) Although in the above embodiment the joint unit supporting the first housing 101 is exemplarily configured as shown in FIGS. 1 and 2, the configuration of the joint unit is not limited thereto. For example, as shown in FIG. 13, a ball joint may be used for the joint unit. A ball joint unit 103b shown in FIG. 13 includes a ball shaft 504 having a spherical end, and a shaft holder 508 holding the spherical end. The spherical end of the ball shaft 504 slidably rotates in a hollow portion of the shaft holder 508, so that the orientation of the first housing 101 can be freely altered. The above idea is applicable also to such a configuration of the projection-type image display device having the joint unit.

(H) Although the second embodiment describes the example in which the rotational axes of the two wheels 236 and 248 are orthogonal to each other, the rotational axes of those wheels 236 and 248 need not necessarily be orthogonal. It would however be preferred to make the two wheels orthogonal to result in effective stirring of air. Three or more wheels may be arranged in the chassis 204.

As described above, the embodiments have been described as exemplifications of the technique in the present disclosure. For this end, the accompanying drawings and the detailed description have been provided.

Accordingly, the constituent elements described in the accompanying drawings and the detailed description may encompass not only constituent elements essential to solve the problem but also constituent elements not essential to solve the problem for the purpose of exemplifying the above technique. Therefore, those unessential constituent elements should not be recognized as being essential immediately from the fact that those unessential constituent elements are described in the accompanying drawings and the detailed description.

The above embodiments are merely for the purpose of exemplifying the technique in the present disclosure, and hence various changes, permutations, additions, omissions, etc., could be performed within the scope of patent claims and the scope of equivalents thereto.

INDUSTRIAL APPLICABILITY

The present disclosure is applicable to a projection-type image display device such as a projector.

The invention claimed is:

1. A projection-type image display device comprising:
a light source unit;
an image generating unit configured to generate image light according to an image input signal;
an illuminating unit configured to guide the light from the light source unit to the image generating unit;
a projecting unit configured to project the image light generated by the image generating unit;
a housing that is cylindrically shaped and houses the light source unit, the image generating unit, the illuminating unit, and the projecting unit;

a first radiator plate thermally connected to the light source unit;
a second radiator plate thermally connected to the image generating unit; and
a single fan that takes in external air to the interior of the housing to send the taken air to the first and the second radiator plates;
a plurality of vents that discharge the air taken in by the single fan outside the housing, each vent being disposed on a side of the housing, wherein
the first and second radiator plates are disposed side by side in a direction perpendicular to a direction of sending air by the fan,
the single fan is disposed on one end of the housing and the projecting unit is disposed on the other end of the housing, so that a direction of sending air by the single fan is coincide with a direction of projecting image light by the projecting unit.

* * * * *